United States Patent
Van Der Waal et al.

(10) Patent No.: US 10,047,212 B2
(45) Date of Patent: *Aug. 14, 2018

(54) CURABLE TRANSPARENT RUBBER COMPOSITION, A CURED TRANSPARENT RUBBER COMPOSITION MADE THEREOF, AND MANUFACTURING PROCESS FOR THE SAME

(71) Applicant: KRATON POLYMER U.S. LLC, Houston, TX (US)

(72) Inventors: Arie Willem Van Der Waal, Ammerstol (NL); Joris Smit, Heerhugowaard (NL)

(73) Assignee: Kraton Polymers U.S. LLC, Houston, TX (US)

(*) Notice: Subject to any disclaimer, the term of this patent is extended or adjusted under 35 U.S.C. 154(b) by 3 days.

This patent is subject to a terminal disclaimer.

(21) Appl. No.: 15/083,925

(22) Filed: Mar. 29, 2016

(65) Prior Publication Data

US 2016/0289420 A1  Oct. 6, 2016

(30) Foreign Application Priority Data

Mar. 30, 2015  (NL) .................................... 2014546

(51) Int. Cl.
| | | |
|---|---|---|
| C08F 10/00 | (2006.01) | |
| C08F 36/00 | (2006.01) | |
| C08K 5/14 | (2006.01) | |
| C08F 287/00 | (2006.01) | |
| C08L 53/02 | (2006.01) | |

(52) U.S. Cl.
CPC .............. C08K 5/14 (2013.01); C08F 287/00 (2013.01); C08L 53/02 (2013.01); C08L 2201/10 (2013.01)

(58) Field of Classification Search
CPC ................ C08F 293/00; C08F 293/005; C08F 297/023; C08F 297/04; C08F 297/044; C08F 297/046; C08L 53/02; C08L 53/025; C08L 2201/10; C08K 5/14
See application file for complete search history.

(56) References Cited

U.S. PATENT DOCUMENTS

| | | | |
|---|---|---|---|
| RE27,145 E | | 6/1971 | Jones |
| 5,292,815 A | * | 3/1994 | Wreesmann .......... C08F 291/02 525/259 |
| 5,563,204 A | * | 10/1996 | Speth .................... B29C 41/003 523/335 |
| 6,610,768 B1 | * | 8/2003 | Jelenic ..................... C08K 5/14 524/386 |
| 9,758,649 B2 | * | 9/2017 | Van Der Waal .... B29C 45/0001 |
| 2006/0155044 A1 | | 7/2006 | Joly et al. |
| 2006/0205874 A1 | | 9/2006 | Uzee et al. |
| 2014/0187704 A1 | | 7/2014 | Kwon et al. |

FOREIGN PATENT DOCUMENTS

| | | |
|---|---|---|
| EP | 2848650 A1 | 3/2015 |
| WO | WO-9514727 A1 * | 6/1995 |
| WO | 20040104095 A1 | 12/2004 |
| WO | 20130025440 A2 | 2/2013 |
| WO | 20140132718 A1 | 9/2014 |

OTHER PUBLICATIONS

International Search Report for PCT/2016/024705, filed Mar. 29, 2016.

* cited by examiner

*Primary Examiner* — Irina Sopjia Zemel
*Assistant Examiner* — Jeffrey S Lenihan
(74) *Attorney, Agent, or Firm* — Samantha Page; Cantor Colburn LLP

(57) ABSTRACT

The present disclosure relates to a solid curable transparent rubber composition containing a styrenic block copolymer having 2 or more poly(vinyl aromatic) blocks, a curing agent and additives. Once cured, the solid curable transparent rubber composition has a haze of less than 30% and a total light transmission of more than 80%. The disclosure further relates to a cured transparent rubber composition made thereof, and a manufacturing process for the cured composition. The present disclosure also relates to an article including the rubber composition, in particular for tubes, medical stoppers, catheters, dental dams and other medical applications and artificial nipples.

12 Claims, No Drawings

CURABLE TRANSPARENT RUBBER COMPOSITION, A CURED TRANSPARENT RUBBER COMPOSITION MADE THEREOF, AND MANUFACTURING PROCESS FOR THE SAME

TECHNICAL FIELD

The present disclosure relates to a curable transparent rubber composition, a cured transparent rubber composition made thereof, and a manufacturing process for the cured composition. The present disclosure also relates to an article including the rubber composition, in particular tubes, medical stoppers, catheters, dental dams and other medical applications, clothes and underclothes, masks, rain gears, eyewear, masks, toys, damping materials, building components, coatings for wiring, packaging materials, protective members for computers, computer peripherals, contraceptive devices, sex toys, artificial nipples, disposable diapers, stationery, containers, food trays, balls for sports, ball chairs, and protection films, seals, key covers and the like.

BACKGROUND OF THE INVENTION

A cured transparent rubber composition is a material which is tough while exhibiting rubber behaviour and through which visible light passes, which for many applications is a desirable property. Applications wherein cured transparent rubber compositions may be used include, but not limited to, tubes, medical stoppers, catheters, dental dams and other medical applications, clothes and underclothes, mask, rain gear, eyewear, toys, damping materials, building components, coating material for wiring, packaging materials, protection members for computers, computer peripherals, contraceptive devices, sex toys, artificial nipples, disposable diapers, stationery, containers, food trays, balls for sports, ball chairs, protective films, seals, key covers and the like. Medical applications and similar applications are of particular interest, provided the minimum requirements with respect to transparency and mechanical properties met.

Thus, a transparent article should be clear and transparent (i.e., total transmittance greater than 80%, with haze below 30%, both according to ASTM D1003-13), and at the same time also have strong mechanical properties, i.e., tear strength greater than 23 kNm, according to ASTM D624, tensile strength greater than 13 MPa and an elongation at break greater than 1000%, both according to ISO 37:2005 (>13), good UV stability, and excellent shelf life as unvulcanised compound.

From WO2013025440 a latex is known, comprising a styrenic block copolymer and a vulcanising agent, as well as a styrenic block copolymer that is particularly suitable for use in such a latex.

WO2004104095 relates to a blend of elastomeric and thermoplastic monovinylidene aromatic-conjugated diene block copolymers, which form transparent elastomeric products.

From EP2848650 a block copolymer composition with a good balance of physical properties suitable for various types of packaging is known.

Excellent transparent rubber compositions have for instance been described in WO2014132718. Even though in this application an improved balance has been found between rubber properties such as hardness and strength on the one hand and transparency on the other hand, there is still a need for further improvement. These improved mechanical properties are particularly important for medical applications and the like. Now a new composition has been found that can be used for medical applications and other applications.

SUMMARY OF THE INVENTION

Accordingly a solid curable transparent rubber composition is provided that once cured has a haze of less than 30% and a total light transmission of more than 80%, both measured according to ASTM D1003-13, comprising:
  Component (a): from 76 to about 100 wt. % of a styrenic block copolymer having 2 or more poly(vinyl aromatic) blocks and at least one block of polymerized conjugated diene, wherein the styrenic block copolymer has a weight average molecular weight of 150,000 to 250,000, the poly(vinyl aromatic) blocks have a weight average molecular weight ranging from 9,000 to 15,000, and the content of poly(vinyl aromatic) blocks in the styrenic block copolymer ranges from 8 to 13 wt. %, based on the total styrenic block copolymer;
  Components (b) and (c): from 0.05-8.0 wt. % of a curing agent, optionally with a co-agent, and
  Component (d): from 0.01-20 wt. % of additives that do not influence the transparency,
  wherein all amounts are in percentages by weight on the total composition.

The present disclosure also provides a transparent, cured rubber composition, based on the curable composition mentioned above. The present disclosure also provides a process for manufacturing a transparent, cured rubber composition, wherein the process comprising the acts of:
  mixing components (a) and (d) to obtain a mixture thereof;
  adding a curing agent (b) and co-agent (c) to the mixture; and
  uniformly kneading the mixture.

DESCRIPTION OF THE INVENTION

The term of "haze" means the degree of dimness in a transparent material, measured according to ASTM D1003-13, by using 2 mm-thick sheet of a test material. The value of haze is determined as a percent of transmitted light which strays from the incident light in the angle of 0.044 rad or more by forward scattering.

The term of "TT" which stands for "total luminous transmittance" means the ratio of light beam passed through a transparent material, measured according to ASTM D1003-13. The value of total luminous transmittance is determined as the ratio of total transmitting light flux with respect to parallel incident light flux on a test article.

The term of "Type A Durometer Hardness" or "Hs" means the hardness of a rubber composition measured according to ASTM D2240. The value of Hs is determined, in the present specification, from the following procedure: constantly pushing a plunger onto a test article, and measuring the depth of the pushed plunger in the article at 0 sec or 30 sec after the pushing.

The term of "tear strength" means the tear strength of a rubber composition measured according to ASTM D624. The value of tear strength is determined, in the present specification, by using 2 mm-thick sheet of a test material, and converted in N/mm unit.

The term of "vinyl content" refers to the amount of a conjugated diene which is polymerized via 1,2-addition (in the case of butadiene-it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The result of the addition above, a pendant vinyl group on the polymer skeleton will be produced. The vinyl content in a polymer may be measured using a conventional technique in the art such as proton NMR.

The vinyl content is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed in U.S. Pat. No. RE 27,145, which disclosure is incorporated by reference.

The terms of "plasticizer oil", "plasticizer", and "softener" mean a (oil-based) compound known as an additive for changing properties of a material in the art. The plasticizer may include, but not limited to, paraffin oil, mineral oil, ester oil, hydrocarbon-based synthetic lubricating oils, naphthenic oils, and vegetable oils.

As used herein, unless otherwise noted, the term "molecular weight(s)" refers to the true molecular weight in g/mole of the polymer or block of the copolymer. The molecular weights referred to in this specification and claims can be measured with gel permeation chromatography (GPC) using polystyrene calibration standards, such as is done according to ASTM 3536. GPC is a method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights, also known as apparent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights". When expressed as apparent molecular weights they are similarly determined with the exception that consideration of the block copolymer composition and the subsequent conversion to true molecular weights is not done.

The words of "comprising", "including", and "containing" mean in the present specification, unless otherwise noted, that an article or component connotes or has an element(s). The spirit of the words may embrace both an internal and external additions.

In the case that the word of "about", "around", or "appropriately" is prefixed to a value, in the present specification, the value can include a tolerance of at least plus/minus 10 percent.

Component (a)

The block copolymer used as component (a) in the composition presented herein will preferably have a simple structure A-B-Y-(B-A)n wherein each A is independently a polymer block composed for at least 90 mole % of an alkenyl aromatic hydrocarbon;
the content of A by weight of the total weight of the polymer (PSC) is in the range of 8-13%;
Y is the remnant of a coupling agent having a functionality greater than 2;
the degree of branching (DoB) is n+1, wherein n is an integer from 2 to 5, preferably 2 to 4;
each B is independently a polymer block composed for at least 90 mole % of one or more conjugated dienes;
the styrenic block copolymer has a coupling efficiency (CE) of at least 90%;
each A block independently has a weight average molecular weight (MW A) ranging from 9,000 to 15,000, and
each B Block independently has a weight average molecular weight (MW B) ranging from 75,000 to 150,000.

The radial styrenic block copolymer may comprise a small amount of uncoupled block copolymer. The uncoupled polymer has the AB structure. As indicated, the A block is a block mainly composed of polymerized alkenyl aromatic hydrocarbon and the B block is a block is mainly composed of polymerized conjugated diene or dienes. For the purposes of the present disclosure, the expression mainly indicates that no more than 10 mole %, preferably less than 5 mole % of copolymerizable monomers may be present.

The blocks A preferably have average molecular weights between about 10,000 and about 12,000. The blocks B preferably have average molecular weights between about 80,000 and about 120,000. The average molecular weights of the alkenyl aromatic hydrocarbon polymer end blocks are determined by gel permeation chromatography, whereas the alkenyl aromatic hydrocarbon polymer content of the block copolymer is measured by infrared spectroscopy of the finished block polymer. The weight percentage of the A blocks in the finished block polymer should be between 8 and 13%, preferably 10% and 12% by weight.

Components (b) and (c)

The curing agent (b) may include, for instance, sulfur, sulfur-containing compounds, radical curing agents, and peroxides. The curing agent is preferably peroxide in view of low contamination and therefore higher transparency in a final product. Excellent results have been achieved with peroxides selected from the group consisting of 2,5-dimethyl-2,5-di-(t-butylperoxy)hexane, dicumyl peroxide, benzoyl peroxide, 1,1-bis-(t-butylperoxy)-3,5,5-trimethylcyclohexane, diisobutyryl peroxide, cumylperoxy neodecanoate, di-n-propylperoxy dicarbonate, di-isopropyl peroxy dicarbonate, di-sec-butylperoxy dicarbonate, 1,1,3,3-tetramethyl-butylperoxy neodecanoate, di-(4-t-butylcyclohexyl)peroxy dicarbonate, di(2-ethylhexyl)peroxy dicarbonate, t-hexylperoxy neodecanoate, t-butylperoxy neodecanoate, t-butylperoxy neoheptanoate, t-hexylperoxy pivalate, t-butylperoxy pivalate, di(3,5,5-trimethylhexanoyl) peroxide, dilauroyl peroxide, 1,1,3,3-tetramethyl-butylperoxy-2-ethylhexanoate, disuccinic acid peroxide, 2,5-dimethyl-2,5-di(2-ethylhexanoylperoxy)hexane, t-hexylperoxy-2-ethylhexanoate, di(4-methyl-benzoyl) peroxide, t-butylperoxy-2-ethylhexanoate, di(3-methyl-benzoyl) peroxide, benzoyl(3-methyl-benzoyl) peroxide, dibenzoyl peroxide, 1,1-di(t-butylperoxy)-2-methyl-cyclohexane, 1,1-di(t-hexylperoxy)-3,3,5-trimethylcyclohexane, 1,1-di(t-hexylperoxy) cyclohexane, 1,1-di(t-butylperoxy)cyclohexane, 2,2-di(4,4-di(t-butylperoxy)cyclohexyl)propane, t-hexylperoxyisopropyl monocarbonate, t-butylperoxy maleic acid, t-butylperoxy-3,5,5-trimethyl hexanoate, t-butylperoxy laurate, t-butylperoxyisopropyl monocarbonate, t-butylperoxy-2-ethylhexyl monocarbonate, t-hexylperoxy benzoate, 2,5-dimethyl-2,5-di(benzoylperoxy)hexane, t-butylperoxy acetate, 2,2-di-(t-butylperoxy)butane, t-butylperoxy benzoate, n-butyl-4,4-di-(t-butylperoxy) valerate, di(2-t-butylperoxyisopropyl)benzene, di-t-hexyl peroxide, t-butylcumyl peroxide, di-t-butyl peroxide, p-menthane hydroperoxide, 2,5-dimethyl-2,5-di(t-butylperoxy)hexyne-3, diisopropylbenzene hydroperoxide, 1,1,3,3-tetramethylbutyl hydroperoxide, cumene hydroperoxide, and t-butyl hydroperoxide.

More preferably, the peroxide is 2,5-dimethyl-2,5-di(t-butylperoxy)hexane (e.g., Trigonox® 101 from AKZO or Perhexa® 25B by NOF Corporation) or 1,1-di(tert-butylperoxy)cyclohexane (eg. Perhexa® C by NOF Corporation, Luperox® 331M80 from Arkema, or Trigonox 22 from AKZO), in order to suppress malodour and residue amount. Also suitable given its stability and ease of use is 2,5-dimethyl-2,5-di(t-butylperoxy)hexyne-3 (e.g., Trigonox 145 from AKZO).

The amount of curing agent (eb) may also be expressed in terms of parts by hundred parts of curable components, here components (a), (b) and (d). Preferably, the amount of curing agent (eb) varies from 0.05 to 1.5 phr, more preferably from 0.1 to 1.0 phr.

As co-agent (c) any one or more selected from the group consisting of ethylene glycol methacrylate (EGDMA), trimethylolpropane trimethacrylate (TMPTMA), triallyl isocyanurate, triallyl cyanurate, diethylene glycol diacrylate, and neophenylene glycol diacrylate may be used.

Co-agent (c) is optional. The lower limit is therefore zero. Then again, its amount will not be more than 7.95 wt. %, when used with 0.05 wt. % of curing agent. With minute amounts of curing agent, e.g., in the range of 0.05-0.1 wt. % of curing agent, the relative amount of co-agent may be high. For instance, the weight ratio (b) to (c) in the above example with 7.95 wt. % co-agent used with 0.05 wt. % of curing agent is 1:159. The weight ratio may therefore vary from 100:1 to 1:100. With small amounts of curing agent, e.g., 0.01-0.09 wt. % of curing agent, the weight ratio may vary up to 1:88, With minor amounts of curing agent, e.g., 0.1-0.15 wt. % of curing agent, the weight ratio may vary up to 1:53. In higher amounts of curing agent, the curing agent and the co-agent are preferably used in a weight ratio (b) to (c) of 1:2-10, more preferably 1:3-7. Particularly preferred combinations are (2,5-dimethyl-2,5-di(t-butylperoxy) hexane, 1,1-di(tert-butylperoxy)cyclohexane or 2,5-dimethyl-2,5-di(t-butylperoxy)hexyne-3 as component (b) with EGDMA or TMPTMA as component (c).

Additives (d)

The composition of the present embodiments may further include additional components as long as the component(s) do not (in the amount used) affect the haze and transparency. The additional component may include, but is not limited to, colorants, modifiers, finishing agents (e.g., zinc laurate), antioxidants (e.g., monophenol, bisphenol, polyphenol, sulfur, phosphorus-based compounds such as Irganox® 1010, Irgafos® 168, Irganox® 1726 and Irganox PS800 manufactured by BASF), reducing agents, oxygen scavengers, light stabilizers, antacids, pH stabilizers, surface treatment agents, heat stabilizers, colorants, fillers, surfactants, gelling agents, biocides, UV absorbents (e.g., salicylic acid, benzophenone, benzotriazole, cyanoacrylate, and hindered amine), dusting agents (e.g., polyolefin such as polyethylene, silica, talc, calcium carbonate powder), flame retardants, and polyphosphoric acid. In particular large amount of fillers, dusting agents, and similar non-transparent additives should be avoided, and is preferably kept to at most 5 wt. %, preferably at most 2 wt. %. A common additive that is preferably avoided, with a preferred maximum of 1 wt. %, is carbon black. Higher amounts will quickly and adversely affect the haze and transparency of the composition. Similar upper limits exist for inorganic fillers and the like.

Preferably, the present composition is substantially free of oil as a softener to avoid oil bleeding.

The colorant may be used such that the composition has transparent or translucent coloring such as clear blue, clear red, and clear green. The colorant may include any conventional colorants used in the art, such as color pigments, extender pigments, anti-corrosive pigments, and functional pigments (e.g., phthalocyanine green, titanium, iron blue, iron oxide, lead suboxide, and zinc sulfide).

The transparent composition of the present embodiments may preferably have less than 30% of haze, more preferably 25% or less of haze in view of enough transparency. If the haze is 30% or more, the transparency of the composition will be too low to meet the practical and aesthetic needs of the market.

The composition of the present embodiments may preferably have 20 or more of Type A Durometer hardness measured at 30 seconds, more preferably from 25 to 40, which is ideal for medical applications, and artificial nipples and the like.

Preferably, the present composition has 80% or more, preferably 84% or more of total luminous transmittance measured according to ASTM D1003-13. If the total luminous transmittance is less than 80%, the composition will lack enough transparency.

Preferably, the composition has 10 N/mm or more, preferably 10 N/mm to 50 N/mm, more preferably 10 N/mm to 40 N/mm of tear strength measured by 2 mm-thick sheet (and converted in N/mm unit) according to ASTM D624. If the tear strength is less than 10 N/mm, the composition may lack durability.

Compounding Procedure

The compounding process preferably comprising the acts of:

mixing components (a) and (d) to obtain a mixture thereof;

optionally adding co-agent (c) to the mixture; and finally adding a curing agent (b)

uniformly kneading the mixture and maturating the same.

The conditions for mixing and for maturating depend on the equipment used. Mixing may for instance be performed according to a "roller mill procedure". One may start with component (a) and introduce this onto a roller mill that is operating at conventional conditions. Roller speed will generally be in the range of 17 to 20 rotations per minute, whereas the rollers are maintained at about 120° C. In step 1, component (d) is combined with component (a). Due to friction the temperature may rise. Preferably the mixing of the components is done at 130° C. or less. Higher temperatures may be used, e.g., where the temperature is allowed to rise to 150° C. despite the negative effects on the colour and stability of component (a), provided the time that component (a) is subjected to the elevated temperature is kept short. Once the mixing is completed, the mixture is removed from the roller mill ("sheet off").

In step (2), the roller mill is operated at about 75° C. and now the components (b) and (c) are added. Preferably component (c), if any, is added first. The procedure is similar to that of step (1), whereby elevated temperatures that may cause pre-cure are (obviously) to be avoided. The product is again sheeted off. Mixing may also be performed with an internal mixer. For instance, using an internal mixer operating at 64 rotations per minute, it is recommended to add component (a) first. To this the component (d) is added. Preferably the core temperature of the mixture is below 135° C. In step (2) the internal mixture is set to about 50° C. and first component (c) is added. Next component (b) is added.

To avoid pre-cure, the core temperature of the mixture should preferably not exceed 90° C.

Preferably the mixture is allowed to maturate before use. It is recommended for maturation to maintain the compound at about ambient temperature for at least 2 or more hours, preferably 6 or more hours, more preferably 10 or more hours.

Injection Moulding Procedure

Various methods for preparing products made from a cured rubber composition are known. For instance, medical stoppers, needle shields, footwear products, damping materials, building components, sex toys, artificial nipple, seals, kitchenware and many other applications are frequently made by compression moulding, injection moulding and transfer moulding. Injection moulding with a sulphur curing agent may be used, but such products lack transparency. That transparent products can be made by injection moulding with a compound comprising a peroxide curing agent was unknown. That the product would even outperform those made by any of the other methods, and compression moulding in particular, was likewise unknown and highly surprising. During injection moulding peroxide curing agents are typically deactivated by the presence of oxygen, included in the compound, at elevated temperatures. In the process of the present disclosure this is avoided by selecting the proper machine (which excludes the presence of air pockets and hence of oxygen); selecting the proper temperatures (here relatively low), and selecting the proper compound (here with a relative low viscosity at low temperatures in the feed zone, transition zone, metering zone and mould cavity). Therefore now cured transparent products can be made by injection moulding with improved mechanical properties. Moreover, curing time is significantly reduced.

Curable rubber compositions tend to be sticky. Moreover, conditions in an injection moulding apparatus appear to adversely affect the transparency of the product. Thus, surprisingly it has now been found that injection moulding, with a specific selection of the components in the compound and with a specific selection of moulding conditions is not only possible, but results in products with improved properties vis-à-vis products made from the same compositions by compression moulding.

Apparatuses for rubber injection moulding are known. Various designs have been developed, from vertical to horizontal injection moulding machines. For transparency and improved mechanical properties specific conditions should be used. The conditions are illustrated by way of example with the aid of a DESMA Hydro-Balance machine with a 25 mm screw and a 350 ccm barrel. The disclosure is not limited to this machine. Moreover, recommended curing times and temperatures on other machines may be slightly different. It is moreover important to employ a machine with an appropriate form of feeding and adapted geometry of the screw and barrel which ensures that little or no air (oxygen) is captured during the process.

By way of injection moulding, shorter curing time is needed as compared to compression moulding and other methods. The injection moulding time may vary from 3-8 minutes, and is about 2 minutes less when compared to the typical time required for compression moulding of a similar article. Likewise the injection moulding temperature varies from 130 to 180° C. and is about 10° C. less when compared to the typical temperature required for compression moulding.

Vertical and horizontal screw inline injection moulding machines may be used. For handling reasons of the slightly sticky strips of compound used in the process of the present disclosure, horizontal injection moulding machines are preferred.

Injection moulding machines may be equipped with a dedicated feeding means. For instance, DESMA injection moulding machines are provided with injection units that apply the First-in-First-out (FiFo) principle. Anyway, the compound is preferably fed in the form of small stripes of about 40×5 mm at various lengths or ribbon of about 40×5 mm. Preferably, industrial environment, an active feed roller is used, which is very effective to feed compounds and in particular soft sticky IR compounds.

A general purpose injection moulding machine has a screw with three main sections. Generally, each section has its own geometry and purpose. The feed zone is the portion of the screw that picks up the material from the base of feeding system and begins to decrease the viscosity of the compound as it is conveyed. Generally the flight depths (feed depth) is constant. This is followed with a compression zone (also referred to as transition zone) wherein the flight depth decreases, causing the compound to further decreasing the viscosity and eliminating air pockets. Finally there is a metering zone wherein the depth of the flights is minimum but constant, to control the amount of the low viscosity compound that is metered into the mould.

As indicated, the maturated compound may be fed to an injection moulding machine provided with an active feeding system connected to a barrel with an inline screw connected to a mould with a cavity, with a feed zone temperature in the range of 30 to 60° C., a transition zone temperature and a metering zone temperature each in the range of 45 to 80° C. and a screw speed in the range of 80 to 130 RPM, and a mould with a cavity temperature in the range of 140 to 190° C. Preferably the temperature in the feed zone is in the range of 35 to 55° C. Preferably the temperature in the transition zone and metering zone is from 50 to 76° C. The preferred temperature in the mould cavity is in the range from 150 to 180° C.

Preferably, the injection speed is from 5 to 20 ccm/s. Obviously this also depends on the complexity of the mould cavity and article to be produced. The injection pressure is preferably in the range of 35 to 100 bar, but may vary from 25 to 120 bar. The clamping force obviously needs to exceed this, and is typically in the range of about 250 bar or more. The after pressure in the mould may vary from 40 to 70 bar, preferably from 50 to 60 bar.

As mentioned before, slightly different conditions may be found when using machines from other suppliers, also depending on the geometry of the product to be made and the geometry of the screw that is used. For instance, the injection moulding machine may employ a single screw, dual screws or even multiple screws. The pitch of the screws may vary, as may the feed depth and the metering depth.

Application

The composition of the present embodiments may be used in any industrial fields that can utilize its high transparency in combination with high tear strength and other mechanical properties. The industrial use may include, but not limited to, medical applications, clothes and underclothes, masks, rain gear, protective glasses and goggles, masks, toys, damping materials, building components, coating material for wiring, packaging materials, protection members for computers, computer peripherals, contraceptive devices, sex toys, artificial nipple, disposable diapers, stationery, containers, food trays, balls for sports, ball chairs, and protective films, and the like.

The composition of the present embodiments may preferably be used to manufacture medical applications and artificial nipples and the like, having high transparency and strength that cannot be produced by the conventional technique.

Note that the aforementioned applications are mere examples of the present embodiments.

EXAMPLES

Embodiments of the present disclosure will now be further illustrated with reference to the following examples, however, without restricting its scope to these embodiments. In the examples the following polymer according the definition of the disclosure has been used, see Table 1.

TABLE 1

|  | (hydrogenated styrenic block copolymer) |
|---|---|
|  | A |
| MW A | 11.8 |
| MW B | 96.2 |
| PSC (%) | 11.5 |
| DoB | 2.7 |
| CE (%) | 94 |

TABLE 2

| | Ingredient (phr) | 1 | 2 | 3 | 4 |
|---|---|---|---|---|---|
| (a) | A | 100 | 100 | 100 | 100 |
| (b) | Trigonox ® 101 | 1 | 2 | — | — |
| (b) | Trigonox ® 145 | — | — | 1 | 2 |
| (c) | TMPTMA | 5 | 5 | 5 | 5 |
| (d) | Irganox ® 1726 | 0.5 | 0.5 | 0.5 | 0.5 |

Examples 1-4

Components (a), and (d) were uniformly kneaded in an open roller at a temperature of ±120° C. The relative amounts are illustrated in Table 2. Component (b) was added in an open roller at a temperature of ±90° C. for Trigonox 101 or ±120° C. for Trigonox 145 and again the mixture was uniformly kneaded. The kneaded rubber was cut off from the roller to a sheet having 2 mm to 3 mm thickness. The sheet was maturated at room temperature for one day and night.

The matured rubber was cured or vulcanized by heating press machine (manufactured by Fontijne Grotnes BV) at the temperature of 150° C. with Trigonox 101 or 160° C. with Trigonox 145 and the pressure of 15 MPa for 6 minutes to obtain a test sample which was subjected under the test procedures discussed hereinbefore to measure the physical and chemical properties. The results are listed in Table 3.

The invention claimed is:

1. A solid curable, transparent, rubber composition that once cured has a haze of less than 30% and a total light transmission of more than 80%, both measured according to ASTM D1003-13, comprising:

Component (a): from 76 to 99.94 wt. % of a styrenic block copolymer having 2 or more poly(vinyl aromatic) blocks and at least one block of polymerized conjugated diene, wherein the styrenic block copolymer has a weight average molecular weight of 150,000 to 250,000, the poly(vinyl aromatic) blocks have a weight average molecular weight ranging from 9,000 to 15,000, and the content of poly(vinyl aromatic) blocks in the styrenic block copolymer ranges from 8 to 13 wt. %, based on the total styrenic block copolymer;

Components (b) and (c): from 0.05-8.0 wt. % of a combination of a curing agent and a co-agent, wherein the co-agent is present in an amount from greater than 0 to 7.95 wt. % and wherein the co-agent is any one or more selected from the group consisting of ethylene glycol methacrylate (EGDMA), trimethylolpropane trimethacrylate (TMPTMA), triallyl isocyanurate, triallyl cyanurate, diethylene glycol diacrylate, and neo-phenylene glycol diacrylate, and Component (d): from 0.01-20 wt. % of additives that do not influence the transparency, wherein the amounts of components (a) through (d) are in percentages by weight of the total composition; and wherein the co-agent (c) is used in a weight ratio (b) to (c) of 1:2-10.

2. The composition according to claim 1, wherein component (b) is a peroxide.

3. The composition according to claim 2, wherein the co-agent (c) is used in a weight ratio (b) to (c) of 1:3-7.

4. The composition according to claim 1, that once cured has at least one of the following properties:

A Type A Durometer hardness (30 sec) of 25 or more, measured according to ASTM D2240; and A Tear Strength of 10 N/mm or more, measured according to ASTM D624.

5. The composition according to claim 1, wherein component (b) is 2,5-dimethyl-2,5-di-(t-butylperoxy)hexane, 1,1-di(tert-butylperoxy)cyclohexane, or 2,5-dimethyl-2,5-di-(t-butylperoxy)hexane.

6. An article based on the composition according to claim 1.

7. A process for manufacturing a transparent, cured rubber composition from the composition according to claim 1, wherein the process comprises the steps of:

mixing components (a), and (d) to obtain a mixture thereof;

adding a curing agent (b) and a co-agent (c); and uniformly kneading the mixture and curing the same.

TABLE 3

| Method | Property | Unit | 1 | 2 | 3 | 4 |
|---|---|---|---|---|---|---|
| ISO 37:2005 | Tensile strength | MPa | 18.1 | 4.6 | 20.3 | 12.3 |
| ISO 37:2005 | Modulus at 100% | MPa | 0.73 | 0.77 | 0.66 | 0.71 |
| ISO 37:2005 | Elongation at break | % | 1032 | 518 | 1168 | 901 |
| ASTM D624 | Tear Strength | kN/m | 40.0 | 23.6 | 38.7 | 38.4 |
| ASTM D2240 | Hardness Shore A, 30 sec. |  | 34.3 | 35.7 | 32.2 | 32.7 |
| ASTM D1003-13 | Haze | % | 22.7 | 21.2 | 22.4 | 22.1 |
| ASTM D1003-13 | Total Transmittance | % | 91 | 83.7 | 91.1 | 84.2 |

8. An article having a composition prepared by the process according to claim 7.

9. The article according to claim 8, wherein the article is selected from the group consisting of tubes, medical stoppers, catheters, dental dams and other medical applications, clothes and underclothes, rain gears, eyewear, masks, toys, damping materials, building materials, coating material for wiring, packaging materials, protective members for computers, computer peripherals, contraceptive devices, sex toys, artificial nipples, disposable diapers, stationery, containers, food trays, balls for sports, ball chairs, protection films, seals, and key covers.

10. A solid curable, transparent, rubber composition that once cured has a haze of less than 30% and a total light transmission of more than 80%, both measured according to ASTM D1003-13, comprising:

Component (a): from 76 to 99.94 wt. % of a styrenic block copolymer having a simple structure A-B-Y-(B-A)n wherein:
each A is independently a polymer block composed of at least 90 mole % of an alkenyl aromatic hydrocarbon;
the content of A by weight of the total weight of the polymer (PSC) is in the range of 8-13%;
Y is the remnant of a coupling agent having a functionality greater than 2;
the degree of branching (DoB) is n+1, wherein n is an integer from 2 to 5;
each B is independently a polymer block composed of at least 90 mole % of one or more conjugated dienes; and
the styrenic block copolymer has a coupling efficiency (CE) of at least 90%;
each A block independently has a weight average molecular weight (MW A) ranging from 9,000 to 15,000, and
each B Block independently has a weight average molecular weight (MW B) ranging from 75,000 to 150,000;

Components (b) and (c): from 0.05-8.0 wt. % of a combination of curing agent and co-agent, wherein the co-agent is present in an amount from greater than 0 to 7.95 wt % and wherein the co-agent is any one or more selected from the group consisting of ethylene glycol methacrylate (EGDMA), trimethylolpropane trimethacrylate (TMPTMA), triallyl isocyanurate, triallyl cyanurate, diethylene glycol diacrylate, and neophenylene glycol diacrylate, and Component (d): from 0.01-20 wt. % of additives that do not influence the transparency,
wherein the amounts of components (a) through (d) are in percentages by weight of the total composition; and
wherein the co-agent (c) is used in a weight ratio (b) to (c) of 1:2-10.

11. The composition according to claim 10, wherein component (a) is a block copolymer the blocks A of which have weight average molecular weights between about 10,000 and about 12,000, and the blocks B thereof have weight average molecular weights between about 80,000 and about 120,000, and wherein the weight percentage of the A blocks in the block polymer is between 10% and 12% by weight.

12. The composition according to claim 10, wherein
Component (b) is any one or more selected from the group consisting of is 2,5-dimethyl-2,5-di-(t-butylperoxy) hexane, 1,1-di(tert-butylperoxy)cyclohexane, and 2,5-dimethyl-2,5-di-(t-butylperoxy)hexane; and
Component (c) is any one or more selected from the group consisting of ethylene glycol methacrylate (EGDMA) and trimethylolpropane trimethacrylate (TMPTMA), wherein component (c) is used in a weight ratio (b) to (c) of 1:3-7.

* * * * *